US008204894B2

(12) United States Patent
Morisada et al.

(10) Patent No.: US 8,204,894 B2
(45) Date of Patent: Jun. 19, 2012

(54) CONTROLLING A SERVER APPARATUS WHICH STORES IMAGE DATA RECEIVED VIA A NETWORK IN MEMORY

(75) Inventors: Chikara Morisada, Kanagawa (JP); Shigeyuki Mitani, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 672 days.

(21) Appl. No.: 11/858,030

(22) Filed: Sep. 19, 2007

(65) Prior Publication Data

US 2008/0016152 A1    Jan. 17, 2008

Related U.S. Application Data

(63) Continuation of application No. 10/762,273, filed on Jan. 23, 2004, now Pat. No. 7,340,449.

(30) Foreign Application Priority Data

Nov. 20, 2003   (JP) .................................. 2003-390407

(51) Int. Cl.
   *G06F 3/05*   (2006.01)
(52) U.S. Cl. ........................................................ 707/756
(58) Field of Classification Search .................. 707/695, 707/999.104, 756; 382/254, 305, 276
   See application file for complete search history.

(56) References Cited

U.S. PATENT DOCUMENTS

| | | | |
|---|---|---|---|
| 5,768,528 A * | 6/1998 | Stumm | ......................... 709/231 |
| 6,351,761 B1 | 2/2002 | Cantone | |
| 6,393,431 B1 * | 5/2002 | Salvati et al. | .......................... 1/1 |
| 6,509,910 B1 * | 1/2003 | Agarwal et al. | ............... 715/752 |
| 6,535,228 B1 * | 3/2003 | Bandaru et al. | ............... 715/752 |
| 6,834,130 B1 * | 12/2004 | Niikawa et al. | ............... 382/305 |
| 6,895,557 B1 * | 5/2005 | Wood et al. | .................... 715/744 |
| 7,149,783 B2 | 12/2006 | Frolik | |
| 7,187,842 B2 | 3/2007 | Ninomiya | |
| 2002/0024538 A1 * | 2/2002 | Bandaru et al. | ............... 345/764 |
| 2002/0078093 A1 * | 6/2002 | Samaniego et al. | ........... 707/513 |
| 2003/0041114 A1 | 2/2003 | Murakami | |

(Continued)

FOREIGN PATENT DOCUMENTS

EP              1 286 292          8/2002

(Continued)

OTHER PUBLICATIONS

Japanese Office Action dated Oct. 21, 2008 issued during prosecution of related Japanese application No. 2003-390407.

*Primary Examiner* — Charles Kim
*Assistant Examiner* — Sheryl Holland
(74) *Attorney, Agent, or Firm* — Fitzpatrick, Cella, Harper & Scinto

(57) ABSTRACT

An object of this invention is to provide a method of controlling a server apparatus for disclosing image data with a representation effect to a third party without any operation of a user, a program for causing a computer apparatus to execute the method, a storage medium which stores the program, and a computer apparatus. The server apparatus which stores image data received from the user via a network in a memory sets a representation effect used to disclose image data. The server apparatus creates page information for displaying the image data with the representation effect, and notifies a third party of the URL of the page information. The third party can browse the image data with the representation effect on the basis of the URL.

7 Claims, 7 Drawing Sheets

U.S. PATENT DOCUMENTS

| | | |
|---|---|---|
| 2003/0065531 A1 | 4/2003 | Satomi |
| 2003/0115277 A1 | 6/2003 | Watanabe |
| 2004/0039657 A1* | 2/2004 | Behrens et al. .................. 705/26 |
| 2004/0046868 A1* | 3/2004 | Anderson et al. ........ 348/207.11 |
| 2004/0104937 A1* | 6/2004 | An ................................ 345/764 |
| 2005/0144653 A1* | 6/2005 | Creamer et al. .............. 725/148 |
| 2006/0077278 A1* | 4/2006 | Parulski et al. .......... 348/333.01 |
| 2007/0192872 A1* | 8/2007 | Rhoads et al. .................. 726/26 |
| 2007/0276841 A1* | 11/2007 | Rhoads et al. .................. 707/10 |
| 2007/0276928 A1* | 11/2007 | Rhoads et al. ................. 709/219 |
| 2008/0126943 A1* | 5/2008 | Parasnis et al. ............... 715/730 |

FOREIGN PATENT DOCUMENTS

| | | |
|---|---|---|
| EP | 1 286 292 | 2/2003 |
| JP | 2001-325386 | 11/2001 |
| JP | 2002-230948 | 8/2002 |
| JP | 2002-352335 | 12/2002 |
| WO | 02/08926 | 1/2002 |

* cited by examiner

CONTROLLING A SERVER APPARATUS WHICH STORES IMAGE DATA RECEIVED VIA A NETWORK IN MEMORY

This application is a continuation of application Ser. No. 10/762,273, filed Jan. 23, 2004 (pending).

FIELD OF THE INVENTION

The present invention relates to a method of controlling a server apparatus which stores image data received via a network in a memory, a program for causing a computer apparatus to execute the method, a storage medium which stores the program, and a computer apparatus.

BACKGROUND OF THE INVENTION

There is a network service which provides a service of storing image data photographed by the user with an image input device in the storage area of a server in a network and allowing the user to browse the image data at desired time. Also, there is a network service which provides a service capable of disclosing stored image data to a third party permitted by the user (U.S. Publication No. US-2003-0065531-A1).

Application software which performs mosaic processing for image data in the client apparatus of the user, and at desired time, cancels mosaic processing to reproduce the original image data is also available.

In the use of this application software, however, only the user who holds a mosaic image and the application software in the client apparatus can see the image. The image cannot be disclosed to a third party.

A representation of disclosing almost the same image data as an original along the lapse of time cannot be made to a third party.

SUMMARY OF THE INVENTION

According to an aspect of the present invention, there is provided a method of controlling a server apparatus which stores image data received via a network in a memory, comprising the steps of setting a disclosure date of the image data, processing the image data to create processed image data and store the processed image data in the memory, determining whether a time ticked in the server apparatus and the disclosure date coincide with each other, when the time ticked in the server apparatus is determined to be earlier than the disclosure date, creating page information for displaying the processed image data, when the time ticked in the server apparatus is determined to be the disclosure date, creating page information for displaying the image data, and transmitting the created page information via the network.

The present invention further provides a program for causing a computer apparatus to execute the method, a storage medium which stores the program, and a computer apparatus.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENT

A preferred embodiment of the present invention will be illustratively described in detail below with reference to the accompanying drawings. The relative arrangement and display window of building components and the like described in the embodiment may not be construed to limit the scope of the present invention to only themselves unless otherwise specified.

A system which provides an image data sharing service as an information providing system will be representatively explained. As described above, the present invention is not limited to this, and is an invention which solves problems common to services using networks. The present invention also includes these services.

An information providing system which provides an image data sharing service via the Internet will be described as an embodiment of the present invention.

In the following description, an interested party who saves image data in a network server will be simply referred to as a user. A third party designated by the user as a partner to whom image data is disclosed will be referred as a browsing user.

Figure 1:
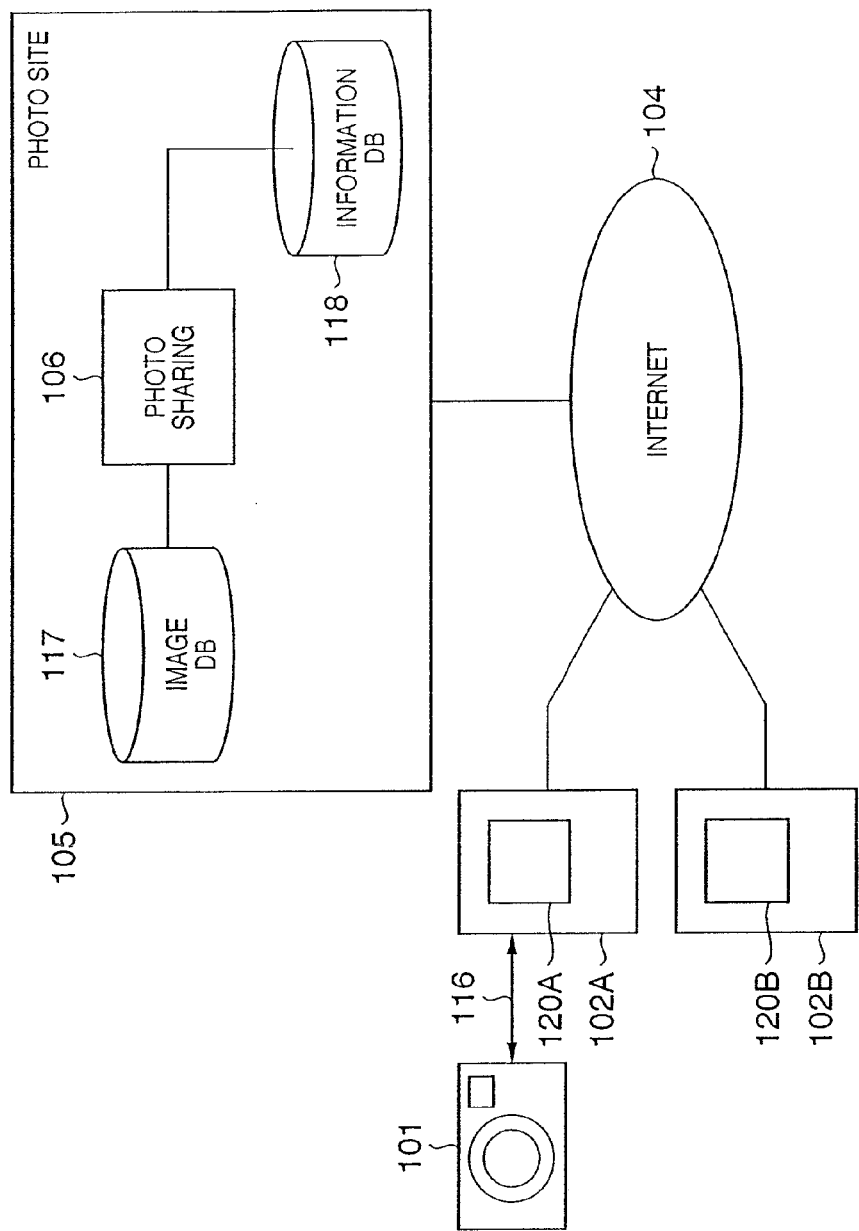
FIG. 1 is a block diagram showing the schematic arrangement of an entire information providing system according to an embodiment of the present invention.

FIG. 1 is a block diagram showing an example of an entire information providing system according to the embodiment.

Reference numeral 101 denotes an image input device such as a digital still camera capable of photographing a still picture and recording it as image data, or a digital video camera capable of photographing a moving picture and recording it as moving picture data. The image input device 101 converts an optical signal serving as image information into an electrical signal, performs predetermined image processing, and then records/reproduces the image as digital information.

Reference numeral 102A denotes a user personal computer (to be simply referred to as a user PC hereinafter). The user personal computer 102A incorporates a Web browser 120A for browsing the Internet, as an application program.

Reference numeral 116 denotes a data transfer interface for transferring, photographed image data between the image input device 101 and the user PC 102A. The data transfer interface 116 may be a wire interface such as USB or IEEE 1394, or a wireless interface such as IrDA or Bluetooth.

Image data which is photographed by the image input device 101 and stored as digital information is transferred via the data transfer interface 116 to the storage area of an information storage such as the HDD of the user PC 102A. As for image data transfer from the image input device 101 to the user PC 102A, image data stored in the information storage of the image input device 101 are transferred at once in accordance with an instruction from an OS or application software installed in the user PC 102A. Alternatively, the OS or application software of the user PC 102A ensures a data recording area in the information recording unit of the user PC 102A in accordance with a transfer command from the image input device 101, and then image data is transferred.

(Example of Upload of Image Data)

Image data transferred to the user PC 102A is uploaded to an image database (DB) 117 of a photo site 105 connected to Internet 104 by the following sequence.

The Web browser 120A of the user PC 102A accesses the photo site 105 by using a standard protocol such as the http protocol. The Web browser 120A displays information which is created in a description language such as HTML or XML, linked to multimedia information such as images and sound, and managed by the server PC of the photo site 105. By this operation, the user PC 102A can receive a service provided by the photo site 105 via the Internet 104.

Image data stored in the information storage area of the user PC 102A is uploaded from the user PC 102A to the photo site 105. An image is uploaded by selecting image data to be uploaded in the Web browser 120A, transmitting an image data upload request to the photo site 105, and synchronously transferring the image data. An image may be uploaded by selecting image data by using image data upload software or the like installed in the user PC 102A and accessing the photo site 105. In either case, upload is executed on the basis of a protocol such as http or ftp which can be used in the Internet 104. A series of operations are executed by a photo sharing module 106 of the photo site 105.

The photo sharing module 106 checks whether uploaded image data is data usable by the photo site 105. If so, the photo sharing module 106 stores the uploaded image data in the image database 117, and stores attribute information or the like in an information database 118. The photo sharing module 106 notifies the user PC 102A that the image data has normally been uploaded.

The database 118 centralizes various data such as user attribute information data registered in the photo site 105 in addition to the above-mentioned image data attribute information.

The user of the user PC 102A can browse the uploaded image data via the Web browser 120A.

Note that uploaded image data may be managed as an album containing one or a plurality of image data.

The PC 102A has been exemplified as a terminal which uploads image data to the photo site 105, but the information providing system according to the present invention is not limited to this. An image may be uploaded from a portable terminal, or image data may be directly uploaded from the image input device 101 such as a digital camera, digital video recorder, scanner, or copying machine.

<Arrangement Example of Photo Site in Information Providing System According to Embodiment>

Processing of setting a representation effect in disclosing image data of the user to the browsing user in the information providing system according to the embodiment will be described in detail.

Note that services and functions realized by the information providing system according to the present invention are not limited to those described above.

Figure 2:
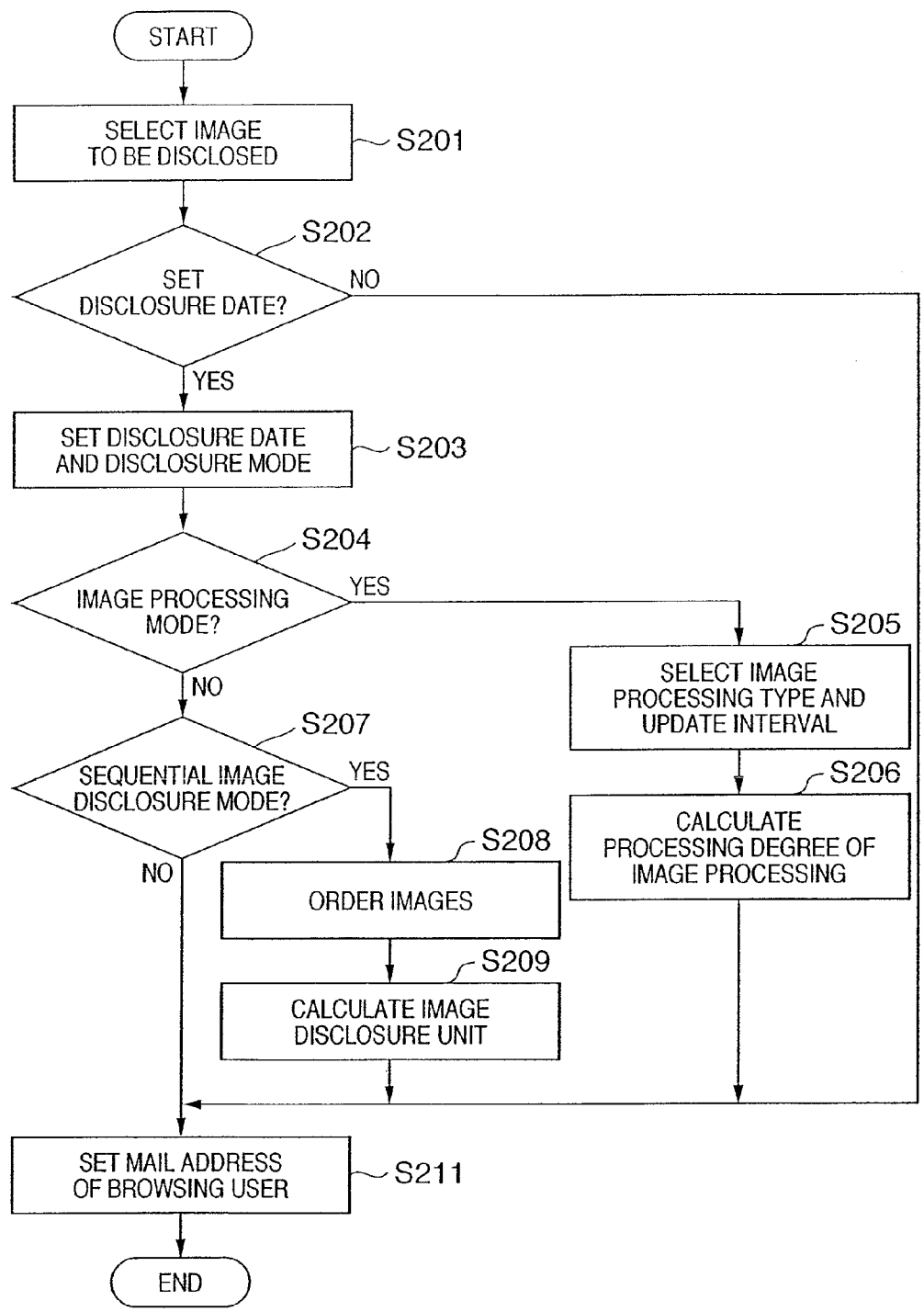
FIG. 2 is a flow chart showing a setting processing sequence of disclosing image data with a representation effect by a server apparatus according to the embodiment.

FIG. 2 is a flow chart showing a processing sequence of setting a representation effect by the photo site 105 according to the embodiment in disclosing image data of the user. The photo site 105 is configured by one or a plurality of servers, and the server comprises a module which executes various functions. The following steps are executed by the server or module.

Step S201:

The photo site 105 transmits to the user PC 102A window information for selecting image data to be disclosed to the browsing user from uploaded image data of the user. The Web browser 120A of the user PC 102A displays an image data selection window on the basis of the window information. The Web browser 120A receives designation of one or a plurality of image data by user operation, and notifies the photo site 105 of the designation. The photo site 105 receives the designation of the image data from the user.

The photo site 105 generates a URL (Universal Resource Locator) necessary to access a Web page for displaying the image data designated by the user. At this time, the generated URL is uniquely assigned to original image data. Alternatively, the URL is uniquely assigned to an album containing a plurality of original image data.

Step S202:

The photo site 105 transmits to the user PC 102A window information for determining whether to set the disclosure date of the image data designated in step S201. The Web browser 120A of the user PC 102A displays a disclosure date setting window on the basis of the window information. The Web browser 120A receives designation by user operation, and notifies the photo site 105 of the designation. The photo site 105 receives from the user the designation of whether to set the disclosure date of the image data.

If NO in step S202, the photo site 105 advances to processing in step S211.

Figure 3:
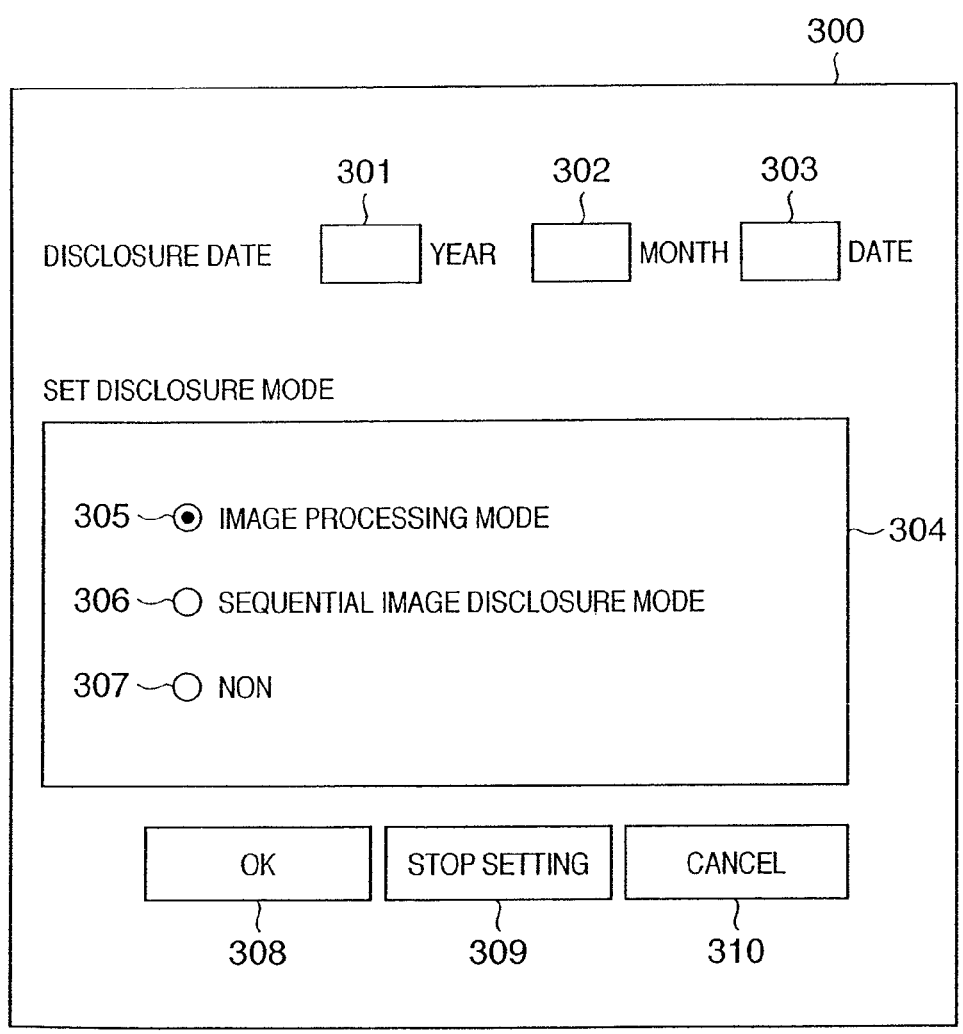
FIG. 3 is a view showing a disclosure date & image disclosure mode setting window according to the embodiment.

Step S203:

If YES in step S202, the photo site 105 transmits to the user PC 102A window information for inputting a disclosure date and disclosure mode for disclosing the image data. The Web browser 120A of the user PC 102A displays a window 300 for setting a disclosure date and disclosure mode as shown in FIG. 3 on the basis of the window information.

In the window 300, a year, month, and date are input to disclosure date regions 301 to 303. Note that the time may be input.

A disclosure mode is set in a region 304. In the embodiment, the disclosure mode can be set from an "image processing mode" 305 in which image data undergoes processing such as mosaic processing, emboss processing, or wipe processing, a "sequential image disclosure mode" 306 in which a plurality of image data are sequentially disclosed, and a "non-effect mode" 307 in which no effect is particularly set in disclosure.

If an OK button 308 is clicked, the photo site 105 is notified of information on the disclosure mode that is input in the window 300. The window 300 stores the information in the information DB 118. The photo site 105 provides the user PC 102A with window information corresponding to the selected one of the modes 305 to 307. If a setting stop button 309 is clicked, the photo site 105 provides the user PC 102A with window information of a contact address window for notifying the user of normal disclosure of image data. If a cancel button 310 is clicked, all processes interrupt.

Step S204:

The photo site 105 determines whether the disclosure mode set in step S203 is the image processing mode.

Step S205:

If YES in step S204, the photo site 105 transmits to the user PC 102A window information for designating the type of image processing to be performed for image data and an interval until image processing is updated.

Figure 4:
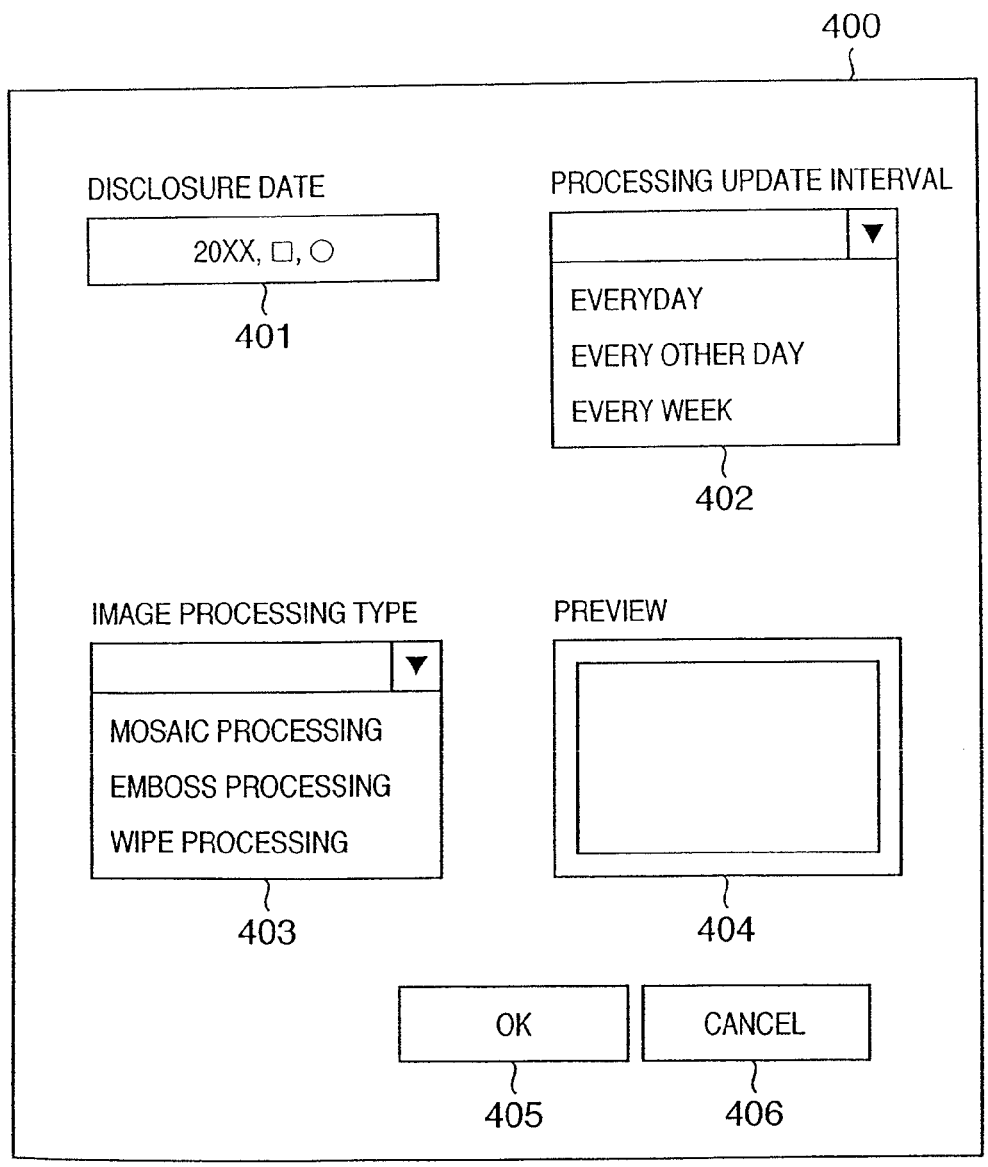
FIG. 4 is a view showing an image processing type selection & disclosure unit setting window according to the embodiment.

The Web browser 120A of the user PC 102A displays a window 400 for selecting an image processing type and processing update interval as shown in FIG. 4 on the basis of the window information.

In the window 400, the disclosure date set in step S203 is displayed in a region 401. Reference numeral 402 denotes a pull-down list for selecting a processing update interval. Selection items in the pull-down list 402 are automatically created by the module of the photo site 105 on the basis of the number of days till the disclosure date 401 from the setting date. For example, "everyday, every other day, every five days" are automatically created when the number of days till the disclosure date from the setting date is 10. "Every month, every three months, or every six months" are automatically created for one year.

Reference numeral 403 denotes a pull-down list for selecting an image processing type. In the embodiment, selection items in the pull-down list 403 are, e.g., mosaic processing, emboss processing, and wipe processing processible by the photo site 105.

Reference numeral 404 denotes a preview window which prompts the user to confirm an example of performing image processing selected from the pull-down list 403 for sample image data.

If an OK button 405 is clicked, the Web browser 120A transmits contents set in the window 400 to the photo site 105. The photo site 105 stores the contents in the information DB 118. If a cancel button 406 is clicked, a series of processes interrupt.

Step S206:

The photo site 105 calculates the processing degree of one image processing on the basis of the image processing update interval designated in step S206 and the disclosure date designated in step S203. The photo site 105 stores the calculated degree in the information DB 118. More specifically, assume that mosaic processing is to be performed and the processing degree of each stage is set to 100 split. Image data having undergone mosaic processing by 1,000,000 split in the first stage, 10,000 split in the second stage, and 100 split in the third stage is disclosed. In the fourth stage, original image data is disclosed. Assume that the number of pixels in each stage is 1,000,000 in disclosing image data at different numbers of pixels. Image data having 1,000,000 pixels in the first stage, 2,000,000 pixels in the second stage, and 3,000,000 pixels in the third stage is disclosed. In the fourth stage, original image data having 4,000,000 pixels is disclosed.

Step S207:

The photo site 105 determines whether the disclosure mode set in step S203 is the sequential image disclosure mode.

Figure 5:
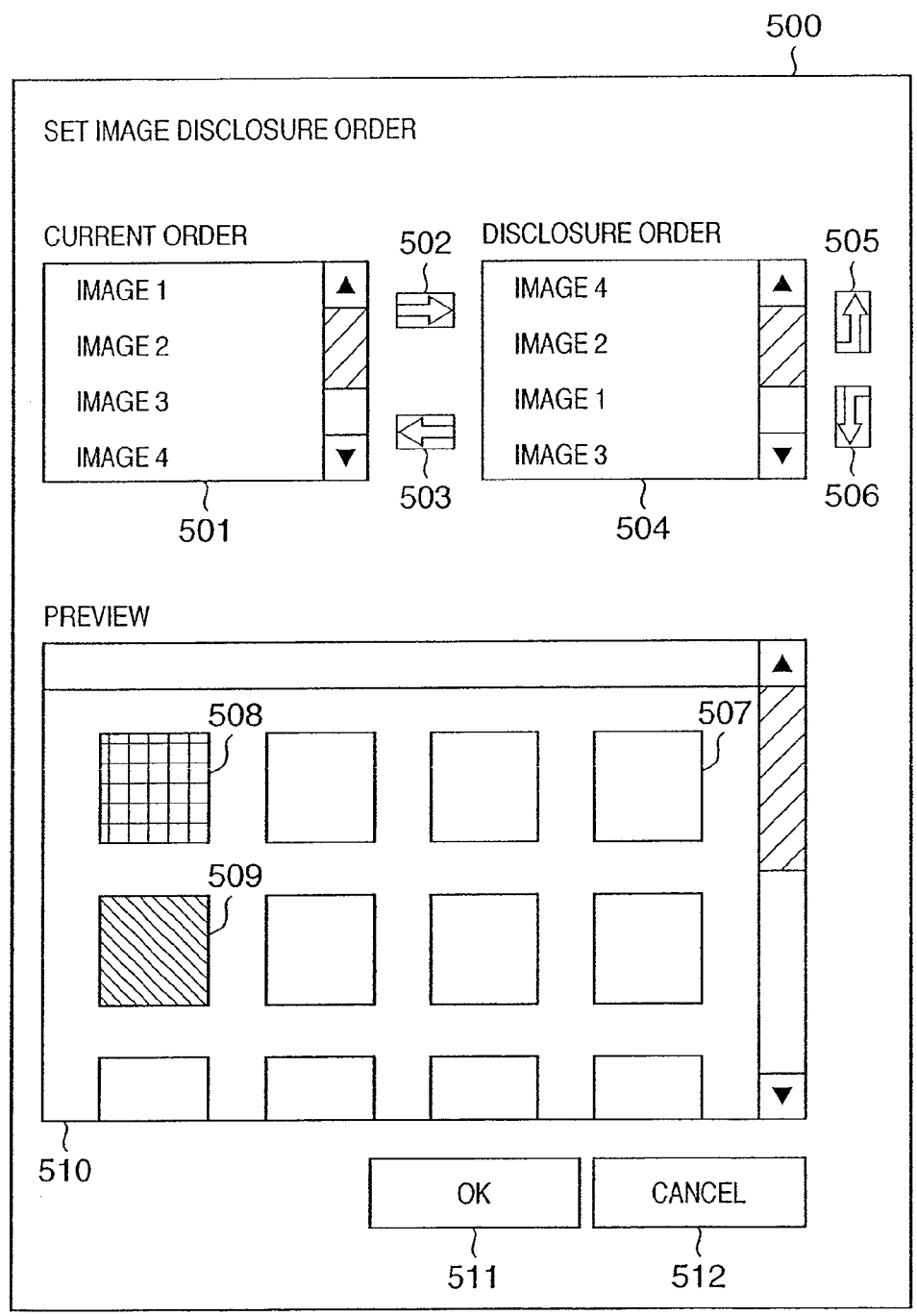
FIG. 5 is a view showing an image data order setting window according to the embodiment.

Step S208:

If YES in step S207, the photo site 105 transmits to the user PC 102A window information for assigning sequence numbers to a plurality of image data designated in step S201. The Web browser 120A of the user PC 102A displays a window 500 as shown in FIG. 5 for assigning sequence numbers to a plurality of image data on the basis of the window information.

In the window 500, the order of current image data is displayed in a region 501. To assign a sequence number, an image data name in the region 501 is selected, and an arrow button 502 is clicked to additionally arrange the image data name in a region 504. Reference numeral 510 denotes a region in which the state of image data, e.g., whether a sequence number has already been assigned, has not been assigned, or is being assigned to the image data is previewed in assigning a sequence number. When an image data name is selected in the region 501, unselected image data 507 in the region 510 is highlighted in a "during selection" color 508. If the image data name is moved to the region 504, the "during selection" color 508 changes to a "selected" color 509. An arrow button 503 cancels an assigned sequence number. Arrow buttons 505 and 506 are used to change a sequence number in an ascending or descending order in the region 504. If an OK button 511 is clicked, settings in the window 500 are determined. If a cancel button 512 is clicked, all processes interrupt.

Figure 6:
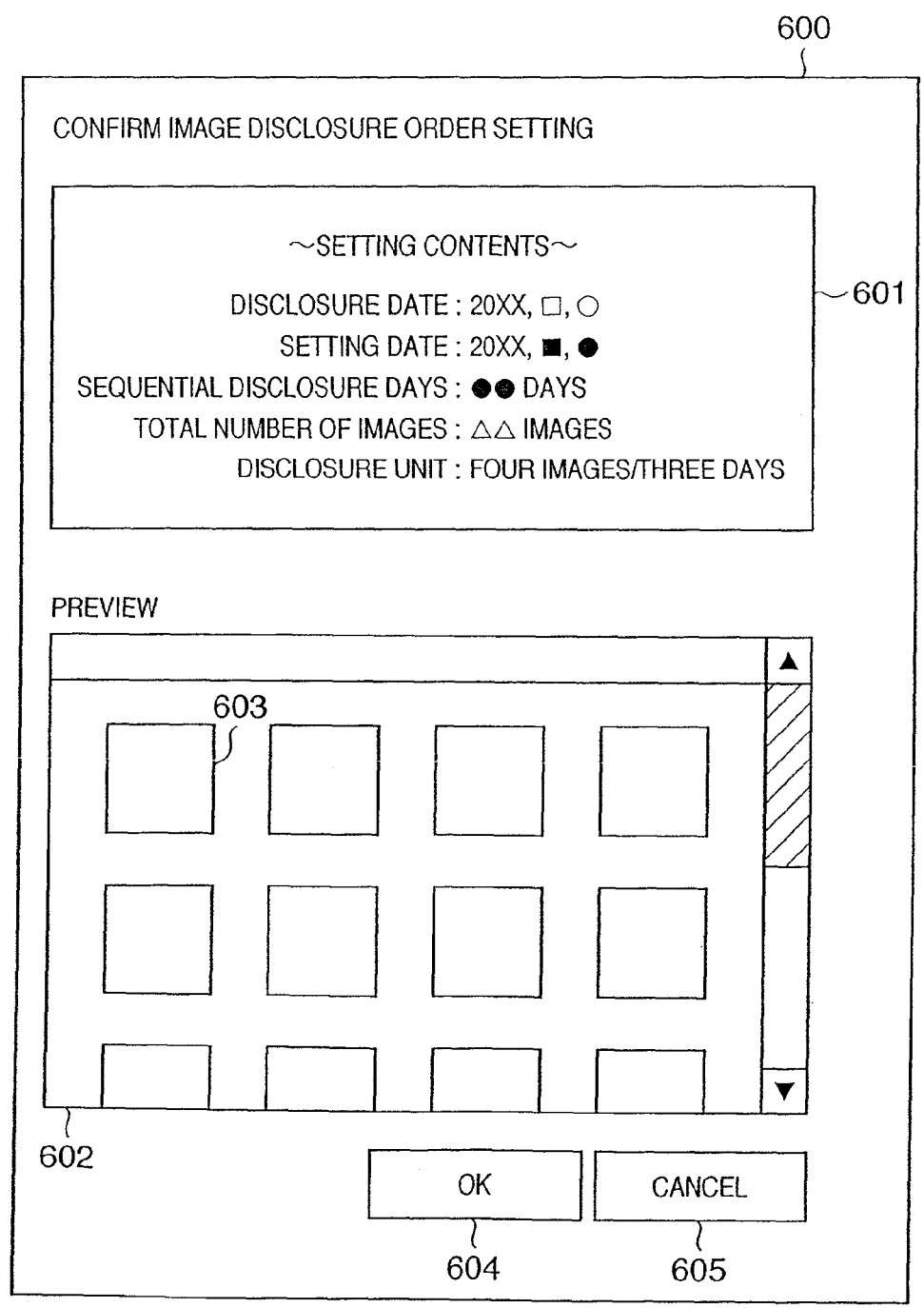
FIG. 6 is a view showing an image data order confirmation window according to the embodiment.

Step S209:

The photo site 105 calculates the interval between days and the number of image data to be disclosed (disclosure unit) on the basis of the disclosure date designated in step S203 and the number of image data designated in step S201. The photo site 105 stores the calculation results in the information DB 118. The photo site 105 transmits to the user PC 102A window information for notifying the user of the calculation results. The Web browser 120A of the user PC 102A displays a window 600 as shown in FIG. 6 for notifying the user of the calculation results on the basis of the window information.

In the window 600, a region 601 displays the disclosure date, the setting date, the number of disclosure days, the total number of images to be disclosed, and the disclosure unit on the basis of information such as the disclosure date set in step S203, the image data disclosure order set in step S208, and the calculation results in step S209. In a region 602, image data 603 are arranged in the order set in step S208. The user confirms setting contents displayed in the window 600, and if no problem occurs, clicks an OK button 604 to notify the photo site 105 of the settings. The photo site 105 stores the setting contents in the information DB 118. To interrupt processing, a cancel button 605 is clicked.

The photo site 105 calculates the disclosure unit in step S209 in the embodiment, but the user may set an arbitrary disclosure unit. The disclosure unit need not be a predetermined number, and a different number of image data may be grouped as a disclosure unit. For example, three image data are disclosed in the first stage, and five image data are newly disclosed in the second stage. The disclosure interval need not be a predetermined period, and may be changed at random such that the disclosure interval from the first stage to the second stage is three days and that from the second stage to the third stage is one week.

Step S211:

The photo site 105 transmits to the user PC 102A window information for setting browsing user information. The Web browser 120A of the user PC 102A displays a browsing user information setting window on the basis of the window information. The Web browser 120A receives inputs such as the e-mail address and name of the browsing user, and notifies the photo site 105 of them. The photo site 105 receives the e-mail address of the browsing user, and stores it in the information DB 118.

The information DB 118 manages image data, albums, and users by assigning IDs. Various pieces of information and processed image data which are stored in the steps of the flow shown in FIG. 2 are stored in correspondence with original image data, albums, and users.

Figure 7:
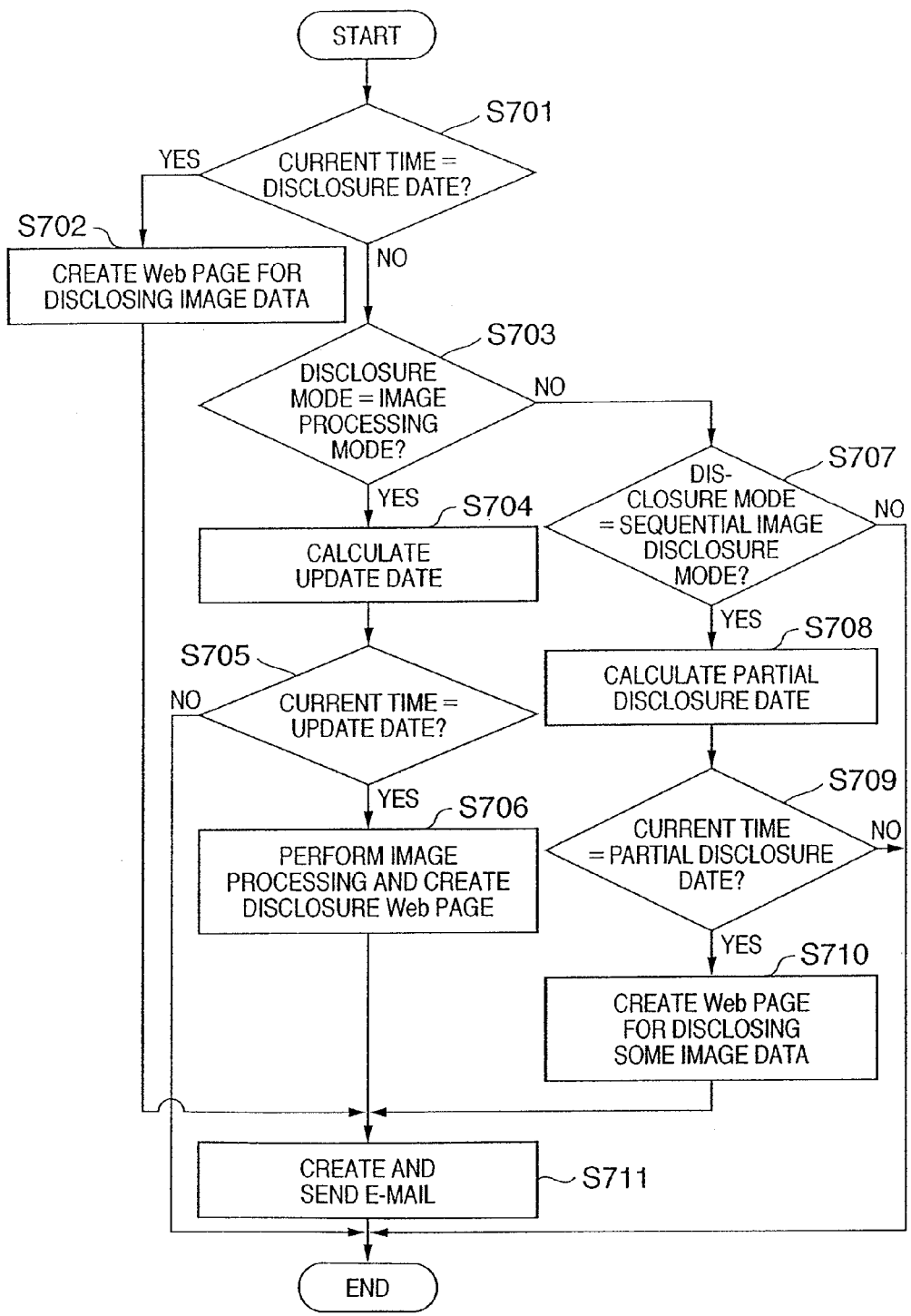
FIG. 7 is a flow chart showing a processing sequence of disclosing image data with a representation effect to the PC of the browsing user by the server apparatus according to the embodiment.

FIG. 7 is a flow chart showing a processing sequence of disclosing image data of the user to the browsing user in the photo site 105 according to the embodiment.

Step S701:

The photo site 105 acquires the time in the information providing system from an OS (Operating System) installed in the server. The photo site 105 compares the acquired time with disclosure date information which is set in step S203 and stored in the information DB 118.

Step S702:

If the time in the system coincides with the disclosure date information as a result of comparison in step S701, the photo site 105 executes processing for disclosing original image data.

The photo site 105 creates Web page information for displaying one or a plurality of original image data stored in the image DB 117, in the Web browser of the user PC 102A. The photo site 105 assigns the URL generated in step S201 to the Web page information.

Step S703:

If the time in the system does not, coincide with the disclosure date information as a result of comparison in step S701, the server of the photo site 105 looks up the information DB 118, and determines whether the disclosure mode is set to the image processing mode.

Step S704:

If YES in step S703, the server in the photo site 105 acquires the image processing update interval which is set in step S205 and stored in the information DB 118. The server calculates an update date.

Step S705:

The server in the photo site 105 compares the time in the system with the update date calculated in step S704.

If the time in the system does not coincide with the update date as a result of comparison in step S705, a series of processes end.

Step S706:

If the time in the system coincides with the update date as a result of comparison in step S705, the server of the photo site 105 acquires the image processing type which is set in step S205 and stored in the information DB 118. The server executes processing of the acquired type (mosaic processing, emboss processing, or wipe processing) for image data.

In this case, the server calculates the stage number of the current processing on the basis of update date information and disclosure date information. The server acquires the processing degree which is calculated in step S206 and stored in the information DB 118. The server performs processing for image data on the basis of the stage number and processing degree, and stores the processed image data in the image DB 117. The server creates a Web page for displaying the processed image data stored in the image DB 117, in the Web browser 120A of the user PC 102A. The server assigns the URL generated in step S201 to the Web page. In this manner, stepwise processing is periodically repeated to gradually disclose almost the same image data as original image data till the disclosure date. The original image data is finally disclosed on the disclosure date.

Step S707:

The server of the photo site 105 looks up the information DB 118, and determines whether the disclosure mode is the sequential image disclosure mode.

Step S708:

If YES in step S707, the server in the photo site 105 acquires the disclosure unit which is set in step S209 and stored in the information DB 118. The server calculates a partial disclosure date.

Step S709:

The server in the photo site 105 compares the time in the system with the partial disclosure date calculated in step S708.

If the time in the system does not coincide with the partial disclosure date as a result of comparison in step S709, a series of processes end.

Step S710:

If the time in the system coincides with the partial disclosure date as a result of comparison in step S709, the server of the photo site 105 acquires the disclosure order and disclosure unit which are assigned in step S209 and stored in the information DB 118. The server creates Web page information for displaying the disclosure number of image data stored in the image DB 117 in the disclosure order, in the Web browser 120A of the user PC 102A.

Step S711:

The server of the photo site 105 acquires the e-mail address of the browsing user from the information DB 118. The Web browser 120A creates e-mail which describes a URL necessary to access the Web page created in step S702, S706, or S710, and sends the e-mail to the e-mail address of the browsing user. If necessary, a password is also described in the e-mail.

The browsing user who has received the e-mail from the photo site 105 activates a Web browser 120B of his/her user PC 102B, accesses the Internet 104, and inputs the URL described in the e-mail to the Web browser 120B of the user PC 102B. The Web browser can display original image data, processed image data having undergone image processing, or some of a plurality of image data in accordance with the description of the Web page information. By assigning a URL in this fashion, processed image data of original image data, a plurality of image data contained in an album, and the original image data can be disclosed with the same URL.

By repeating the above-described disclosure processing, the browsing user can browse image data which gradually approaches the original quality, and finally browse the original image data. Alternatively, the browsing user can sequentially browse a plurality of image data contained in an album, and finally browse all image data contained in the album.

In the present invention, image data is processed in step S706 on an update date to create and save processed image data. The present invention is not limited to this, and image data may undergo processes in a plurality of stages before an update date to create and save a plurality of processed image data. In this case, a Web page for displaying, of processed image data saved in advance, processed image data before the update date that corresponds to an acquisition date in the system is created in step S706.

As described above, according to the present invention, a network server performs stepwise editing processing along the lapse of time for original image data of the user. The server also discloses the edited image data to a third party. The user can easily disclose the image data with a representation effect to a third party.

The object of the present invention is also achieved when a storage medium (or recording medium) which stores software program codes for realizing the functions of the above-described embodiment is supplied to a system or apparatus, and the computer (or the CPU or MPU) of the system or apparatus reads out and executes the program codes stored in the storage medium. In this case, the program codes read out from the storage medium realize the functions of the above-described embodiment, and the storage medium which stores the program codes constitutes the present invention. The functions of the above-described embodiment are realized when the computer executes the readout program codes. Also, the functions of the above-described embodiment are realized when an OS (Operating System) or the like running on the computer performs part or all of actual processing on the basis of the instructions of the program codes.

Furthermore, the present invention includes a case in which, after the program codes read out from the storage medium are written in the memory of a function expansion card inserted into the computer or the memory of a function expansion unit connected to the computer, the CPU of the function expansion card or function expansion unit performs part or all of actual processing on the basis of the instructions of the program codes and thereby realizes the functions of the above-described embodiment.

When the present invention is applied to the storage medium, the storage medium stores program codes corresponding to the above-described flow charts.

As many apparently widely different embodiments of the present invention can be made without departing from the spirit and scope thereof, it is to be understood that the invention is not limited to the specific embodiments thereof except as defined in the appended claims.

What is claimed is:

1. A method of controlling a server apparatus which stores in a memory received image data received via a network, comprising the steps of:
    setting a disclosure date of a received image represented by the received image data;
    processing the received image data so as to create a plurality of processed images each represented by received and processed image data, wherein said processing step is executed plural times;
    transmitting first Web page information containing a selection region for use in selecting an interval at which the plural times of said processing step are to be executed, wherein the selection region includes a plurality of interval candidates and the plurality of interval candidates varies on the basis of a time period until the set disclosure date;
    receiving an interval at which the plural times of said processing step are to be executed, the received interval being selected by a user via said selection region;
    based on the received interval, setting an interval at which the plural times of said processing step are to be executed;
    setting a level of processing to be performed for the received image data to create each of the plurality of processed images such that a quality of each of the plurality of processed images is lower than a quality of the received image and the quality of each processed image differs from each other;
    comparing a time ticked in the server apparatus and the set disclosure date;
    creating second Web page information linked to the processed image represented by the received and processed image data at intervals of the set interval when the time ticked in the server apparatus is determined to be earlier than the set disclosure date, such that the created second Web page information is linked to the processed image with higher quality as the set disclosure date approaches, and creating third Web page information linked to the received image represented by the received image data when the time ticked in the server apparatus is determined to be the set disclosure date; and
    transmitting, via the network, the created second Web page information linked to the processed image represented by the received and processed image data at intervals of the set interval before the set disclosure date, and transmitting the created third Web page information linked to the received image represented by the received image data on the set disclosure date, to a specified recipient.

2. The method according to claim 1, wherein a same address in the network is assigned for transmitting the second Web page information linked to the processed image represented by the received and processed image data and the third Web page information linked to the received image represented by the received image data.

3. The method according to claim 1, wherein said processing includes at least one of mosaic processing, emboss processing, and wipe processing.

4. The method according to claim 1, further comprising a mode selecting step of selecting a first mode in which the processing of the received image data in said processing step is performed or a second mode in which the processing of the received image data in said processing step is not performed.

5. A non-transitory computer-readable storage medium on which is stored a computer-executable program for a method of controlling a server apparatus which stores in a memory received image data received via a network, the program comprising computer-executable code for performing the steps of:
    setting a disclosure date of a received image represented by the received image data;
    processing the received image data so as to create a plurality of processed images each represented by received and processed image data, wherein said processing step is executed plural times;
    transmitting first Web page information containing a selection region for use in selecting an interval at which the plural times of said processing step are to be executed, wherein the selection region includes a plurality of interval candidates and the plurality of interval candidates varies on the basis of a time period until the set disclosure date;
    receiving an interval at which the plural times of said processing step are to be executed, the received interval being selected by a user via said selection region;
    based on the received interval, setting an interval at which the plural times of said processing step are to be executed;
    setting a level of processing to be performed for the received image data to create each of the plurality of processed images such that a quality of each of the plurality of processed images is lower than a quality of the received image and the quality of each processed image differs from each other;
    comparing a time ticked in the server apparatus and the set disclosure date;
    creating second Web page information linked to the processed image represented by the received and processed image data at intervals of the set interval when the time ticked in the server apparatus is determined to be earlier than the set disclosure date, such that the created second Web page information is linked to the processed image with higher quality as the set disclosure date approaches, and creating third Web page information linked to the received image represented by the received image data when the time ticked in the server apparatus is determined to be the set disclosure date; and
    transmitting, via the network, the created second Web page information linked to the processed image represented by the received and processed image data at intervals of the set interval before the set disclosure date, and transmitting the created third Web page information linked to the received image represented by the received image data on the set disclosure date, to a specified recipient.

6. A server apparatus which stores received image data received via a network in a memory, comprising:
- a disclosure date setting unit configured to set a disclosure date of a received image represented by the received image data;
- a processing unit configured to process the received image data so as to create a plurality of processed images each represented by received and processed image data, wherein said processing by the processing unit is executed plural times;
- a first transmitting unit configured to transmit first Web page information containing a selection region for use in selecting an interval at which the plural times of said processing by the processing unit are to be executed, wherein the selection region includes a plurality of interval candidates and the plurality of interval candidates varies on the basis of a time period until the set disclosure date;
- a receiving unit configured to receive an interval at which the plural times of said processing by the processing unit are to be executed, the received interval being selected by a user via said selection region;
- an interval setting unit configured to set, based on the received interval, an interval at which the plural times of said processing by the processing unit are to be executed;
- a processing level setting unit configured to set a level of processing performed for the received image data to create each of the plurality of processed images such that a quality of each of the plurality of processed images is lower than a quality of the received image and the quality of each processed image differs from each other;
- a comparing unit configured to compare a time ticked in the server apparatus and the set disclosure date;
- a page creating unit configured to create second Web page information linked to the processed image represented by the received and processed image data at intervals of the set interval when the time ticked in the server apparatus is determined to be earlier than the set disclosure date, such that the created second Web page information is linked to the processed image with higher quality as the set disclosure date approaches, and to create third Web page information linked to the received image represented by the received image data when the time ticked in the server apparatus is determined to be the set disclosure date; and
- a second transmitting unit configured to transmit, via the network, the created second Web page information linked to the processed image represented by the received and processed image data at intervals of the set interval before the set disclosure date, and to transmit the created third Web page information linked to the received image represented by the received image data on the set disclosure date, to a specified recipient.

7. The server apparatus according to claim 6, further comprising a mode selecting unit configured to select a first mode in which the processing of the received image data by said processing means is performed or a second mode in which the processing of the received image data by said processing means is not performed.

* * * * *